US006497118B1

(12) United States Patent
Schermerhorn

(10) Patent No.: US 6,497,118 B1
(45) Date of Patent: Dec. 24, 2002

(54) METHOD AND APPARATUS FOR REDUCING REFRACTORY CONTAMINATION IN FUSED SILICA PROCESSES

(75) Inventor: Paul M. Schermerhorn, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 197 days.

(21) Appl. No.: 09/664,822

(22) Filed: Sep. 19, 2000

(51) Int. Cl.[7] .............................................. C03B 19/06
(52) U.S. Cl. ........................ 65/17.4; 65/356; 431/160; 431/187; 431/188; 431/326
(58) Field of Search ................................. 431/160, 187, 431/188, 326; 65/17.4, 356, 374.1, 374.11, 374.12, 374.13

(56) References Cited

U.S. PATENT DOCUMENTS

| 3,505,557 | A | * | 4/1970 | Hutton, Jr. ................... 313/270 |
| 3,652,251 | A | * | 3/1972 | Brichard ...................... 110/336 |
| 3,947,233 | A | * | 3/1976 | Sundberg ..................... 431/328 |
| 4,303,386 | A | | 12/1981 | Voorheis et al. ............. 431/177 |
| 4,582,479 | A | * | 4/1986 | Battles ........................ 431/160 |
| 4,775,314 | A | * | 10/1988 | Sternling .................... 110/347 |
| 4,803,948 | A | | 2/1989 | Nakagawa et al. .......... 118/725 |
| 4,950,156 | A | | 8/1990 | Philipossian ................ 432/253 |
| 4,988,286 | A | * | 1/1991 | Hersh ......................... 239/434 |
| 5,217,363 | A | * | 6/1993 | Brais et al. .................. 239/401 |
| 5,249,953 | A | * | 10/1993 | Roth ....................... 126/92 AC |
| 5,395,413 | A | | 3/1995 | Sempolinski et al. ......... 65/414 |
| 5,567,141 | A | | 10/1996 | Joshi et al. ..................... 431/8 |
| 5,735,928 | A | | 4/1998 | Sayce et al. ................. 65/531 |
| 5,932,293 | A | * | 8/1999 | Belashchenko et al. ..... 118/308 |
| 6,367,288 | B1 | * | 4/2002 | Lindner et al. ............. 431/159 |

FOREIGN PATENT DOCUMENTS

| JP | 57-013738 | 1/1982 |
| JP | 59-038373 | 3/1984 |
| JP | 59-116369 | 7/1984 |

OTHER PUBLICATIONS

Wolf, "Silicon Processing for the VLSI Era, vol. 2: Process Integration", pp 144–146, 1990, Lattice Press (no month available).

* cited by examiner

Primary Examiner—Sean Vincent
(74) Attorney, Agent, or Firm—Burt Turner; Timothy M. Schaeberle

(57) ABSTRACT

In furnaces for producing high purity fused silica glass boules, the refractory in the area of the burner holes reaches such elevated temperatures that cause impurities to leach out and the dissociation of the refractory, causing contamination of the silica glass. In order to reduce the temperature of the burner hole refractory, a porous insert or liner is positioned within the burner hole and a suitable gas is supplied thereto. The gas diffuses through the porous liner and not only cools the liner and refractory, but also forms a boundary layer along an inside surface of the insert that prevents particle buildup. The cooling of the insert and surrounding burner hole refractory prevents contamination of the silica glass from the refractory.

10 Claims, 3 Drawing Sheets

METHOD AND APPARATUS FOR REDUCING REFRACTORY CONTAMINATION IN FUSED SILICA PROCESSES

FIELD OF THE INVENTION

This invention relates to the production of high purity fused silica glass, and in particular, to methods and apparatus for minimizing the contamination of the silica glass from the dissociation of crown refractory.

BACKGROUND OF THE INVENTION

In overview, high purity fused silica glass is made by depositing fine particles of silica in a refractory furnace at temperatures exceeding 1650° C. The silica particles are generated in a flame when a silicon containing raw material along with natural gas is passed through a fused silica producing burner into the furnace chamber. These particles are deposited and consolidated onto a rotating body. The rotating body is in the form of a refractory cup or containment vessel, which is used to provide insulation to the glass as it builds up, and the furnace cavity formed by the cup interior and the crown of the furnace is kept at high temperatures. In the art, glass-making procedures of this type are known as vapor phase hydrolysis-oxidation processes, or simply as flame hydrolysis processes. The body formed by the deposited particles is often referred to as a "boule" and it is understood that this terminology includes any silica-containing body formed by a flame hydrolysis process.

A typical prior art furnace for producing fused silica glass includes an outer ring wall, which supports a refractory crown. The crown is provided with a plurality of burner holes, and each such burner hole is provided with a burner positioned there above at an inlet end for directing a flame through the burner hole into the cavity of the furnace. The furnace is provided with a rotatable base, which with the containment wall forms a cup or containment vessel. The rotatable base, forming the bottom of the cup-like containment vessel, is covered with high purity bait which collects the initial silica particles forming the boule.

The refractory crown, having the burners positioned thereon, functions to trap heat within the furnace. However, since the flame and soot from the burners pass through the burner holes in the refractory crown, the burner holes are maintained at elevated temperatures. Such elevated temperatures in the vicinity of each burner hole cause impurities to leach out of the refractory and produce undesirable dissociation of the refractory which contaminates the silica glass.

If the refractory of the burner hole could be operated at a reduced temperature, it would be possible to reduce the amount of contamination of the glass from the refractory. Also, such reduction in temperature would result in an increase in the internal transmission in the ultraviolet range (<400 nm), thus reducing glass defects and/or contamination. It thus became an object of present invention to reduce the temperature of the refractory material surrounding burner holes in a flame hydrolysis furnace by creating a cooling boundary layer adjacent sidewalls of the burner holes.

The use of gaseous curtains are know for unrelated purposes, such as for preventing the contamination of wafers in semiconductor manufacturing as shown in U.S. Pat. Nos. 4,803,948 and 4,950,156; and for cooling burner nozzles with oxygen as shown in U.S. Pat. Nos. 4,303,386 and 5,567,141. Also U.S. Pat. No. 5,735,928 suggests the use of many layers of gases to provide different types of shields.

It is apparent that there is a need for not only recognizing a problem of contamination of silica glass from over-heated burner hole refractory in high purity fused silica processes, but also for a solution to such problem while maintaining high quality fused silica glass boules.

SUMMARY OF THE INVENTION

In view of the forgoing, it is an object of this invention to provide improved method and apparatus for producing silica-containing boules by flame hydrolysis. In particular, it is an object of the invention to reduce burner hole refractory temperatures and virtually prevent the contamination of the silica glass from the refractory. It is a further object of the invention to increase the transmission in the ultraviolet range within the glass and to control glass stoichiometry. These and other objects are obtained by utilizing a porous liner in the burner hole and purging the porous material with a suitable gas to not only cool the liner, but also to create a gas boundary layer that prevents particle buildup in the burner hole and maintains the burner hole at a reduced temperature.

DESCRIPTION OF THE PREFERRED EMBODIMENTS

Having identified the problem of glass contamination from the burner hole refractory due to the elevated temperatures of the burner hole, various solutions to problem were conceived. However, in order to preserve the integrity of the burner hole, the use of a liner or insert met this criterion. It was then necessary to provide some form of cooling, both for the insert and the refractory walls of the burner hole. A liner of porous material that could be purged with a suitable gas met this need and provided additional benefits.

Any suitable porous material may be utilized within the burner hole liner insert, including porous metal, porous silica or porous refractory material. In regards to porous metal inserts, porous metals with an appropriate flow rate can be comprised of inconel, stainless steels, or hastalloy. Porous refractory material inserts can be comprised of silica, alumina, zirconium, zirconia, and/or other appropriate porous materials with appropriate temperature and reactivity resistance. The porous material may be purged with a gas of oxygen, argon, nitrogen or other appropriate gases including ambient air. The flow of gas through the porous portion of the insert not only functions to cool the insert liner, but also the refractory burner hole area, thus virtually preventing the leaching of impurities from the refractory and the dissociation of the refractory. Accordingly, contamination of the silica glass from the burner hole refractory is reduced if not eliminated. The gas purged through the porous liner creates a boundary layer adjacent the insert within the burner hole that prevents particle buildup in the burner hole. Also, such flow of gas through the burner hole maintains the burner hole at a reduced temperature, further preventing dissociation of the refractory and the leaching of impurities therefrom, thus reducing the tendency for refractory contamination of the glass. Hydrogen or nitrogen can be utilized as part of the purging gasses to help control the glass stoichiometry.

Figure 1:
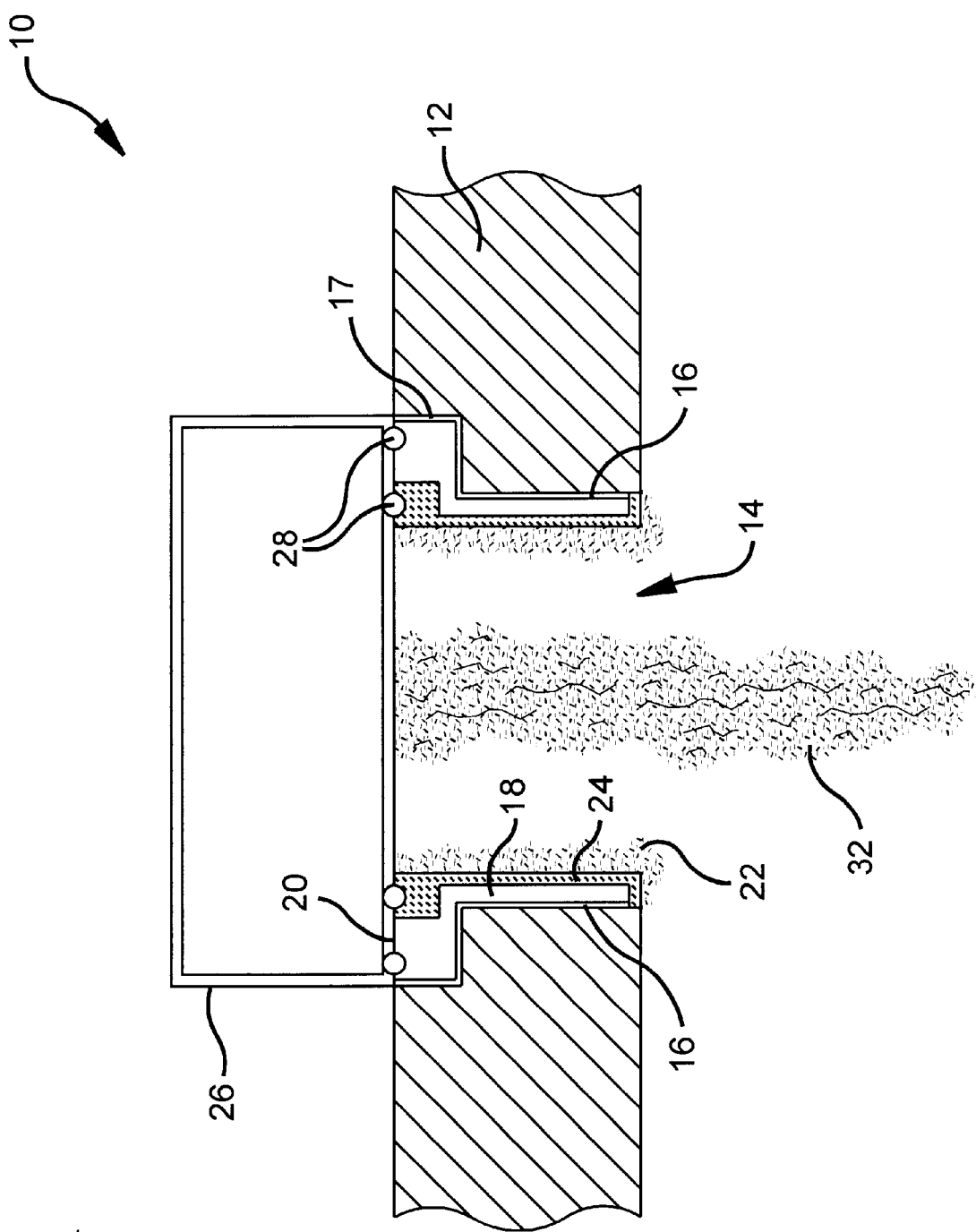
FIG. 1 is a fragmental schematic view in elevation of a porous insert positioned within a burner hole formed in the refractory crown of a high purity fused silica furnace embodying the present invention, and showing the burner positioned directly on top of the crown.

Referring now to FIG. 1, a refractory crown 12 of a high purity fused silica furnace 10, is shown having a burner hole 14 formed therethrough. An insert or liner 16, having an outer housing portion 17 of a suitable material such as stainless steel, is positioned within the burner hole 14. The insert 16 has a closed-end flow passage 18 therewithin, having an inlet end 20 connected to a suitable source of gas under pressure. Such gas could include air, oxygen, argon and nitrogen, plus other appropriate gases. The gas entering inlet end 20 and flowing into the closed-end flow passage 18, diffuses through a porous inner wall portion 24 of insert 16 and forms a gas boundary layer 22 along the inner wall 24 of the insert liner 16, which boundary layer prevents particle buildup in the burner hole and maintains the burner hole at a reduced temperature. The flow of gas through the porous wall portion 24 of liner 16 cools both the liner and the burner hole refractory, thus reducing glass contamination from the refractory. The porous wall 24 extends across a bottom portion of the liner 16, which further inhibits particle buildup about the outlet end of the burner hole 14.

As shown in FIG. 1, burner 26 is positioned in a sealed relationship with the insert 16. Suitable seals 28 function to seal the insert 16 to the face of the burner 26 thereby controlling the process gases entering through the crown area.

Figure 2:
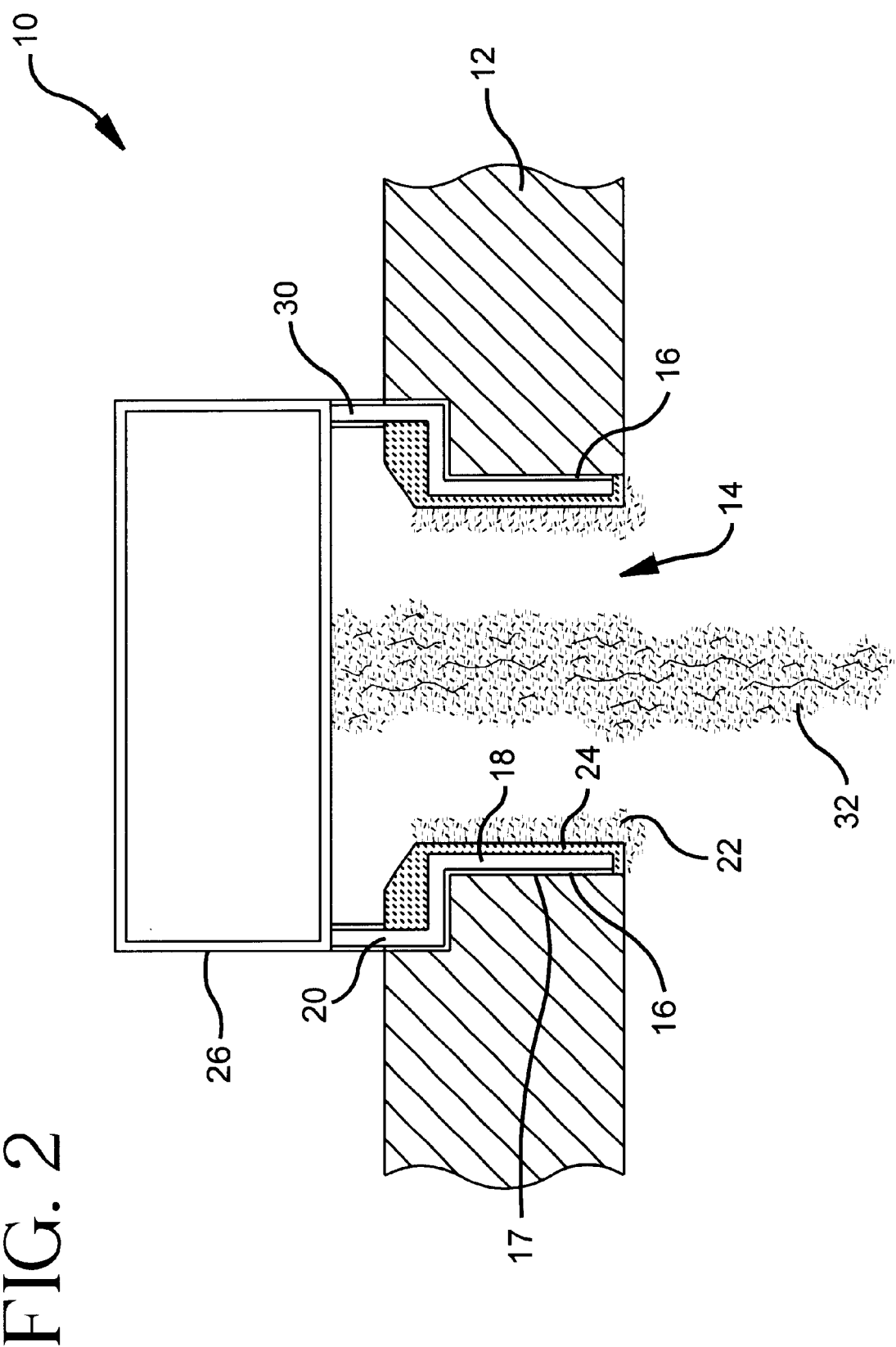
FIG. 2 is a fragmental schematic view in elevation similar to FIG. 1, but showing the burner raised off of the top of the refractory furnace crown to allow ambient atmosphere to enter the furnace chamber.
Figure 3:
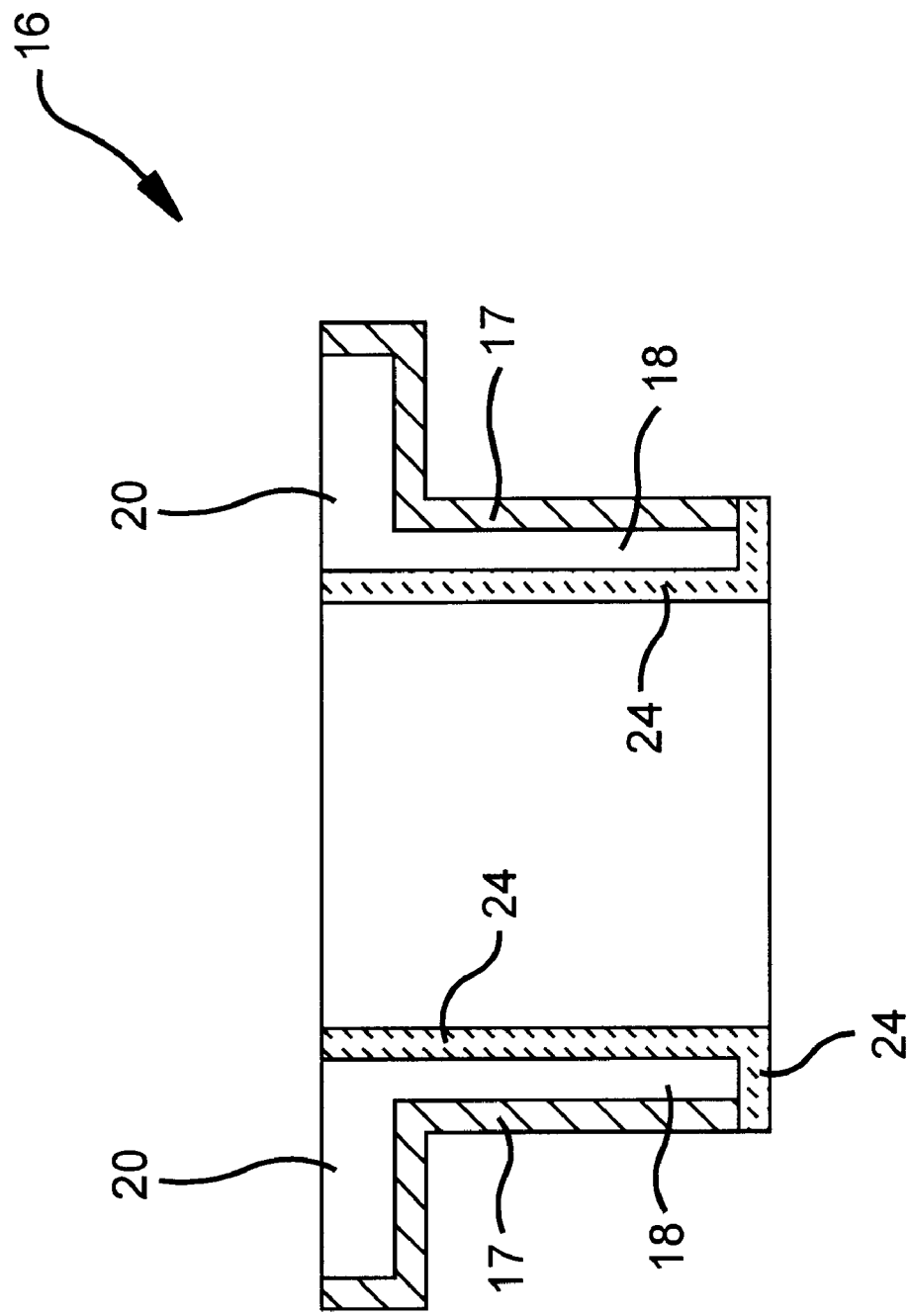
FIG. 3 is an enlarged elevational schematic view in section of a typical porous insert.

The configuration of the insert 16 of FIG. 2 is similar to that of FIG. 1, however, in FIG. 2 a gap is provided between the face of the burner and the porous liner 16 by supports 30, thus creating an area for ambient air to enter the furnace chamber. The laydown soot and flame from the burner passing through the burner hole is shown at 32.

Although I have disclosed the now preferred embodiments of my invention, additional embodiments may be perceived by those skilled in the art without departing from the spirit and scope of the invention as defined in the appended claims.

I claim:

1. A furnace for producing silica glass which comprises:
   said furnace having a refractory crown,
   at least one burner hole extending through said refractory crown,
   a burner positioned above said crown for providing a flame within and along the extent of said burner hole,
   porous insert means positioned within said burner hole for cooling the refractory about said burner hole and for preventing contamination of the glass from such refractory, and
   said porous insert means for cooling the refractory includes a porous wall portion in open communication with an interior portion of said burner hole and extending along the extent of said burner hole.

2. A furnace for producing silica glass as defined in claim 1 wherein said porous insert means includes flow passage means, having an inlet end communicating with a source of gas, for diffusing such gas through said porous wall portion and for forming a boundary layer of gas along the inner wall of said insert.

3. A furnace for producing silica glass as defined in claim 1, wherein said porous wall portion is formed of a material selected from the group consisting of porous metal, porous silica, and porous refractory.

4. A furnace for producing silica glass as defined in claim 1, wherein said burner is positioned in sealing relationship with said porous insert means for controlling the process gasses entering through the burner hole.

5. A furnace for producing silica glass as defined in claim 1, wherein support means position said burner in spaced-apart relation with said porous insert means for creating an area for ambient air to enter the furnace through said burner hole.

6. Porous insert means for cooling refractory material about a burner hole extending through said refractory which comprises:
   a liner positioned within said burner hole having an outer housing portion in contact with wall portions of such burner hole,
   said liner having flow passage means therewithin which is closed at one end and open at an inlet end,
   said inlet end being in communication with a gas under pressure, and
   said liner having porous inner wall means extending along and in open communication with said burner hole for diffusing such gas under pressure from said flow passage through said porous inner wall of said liner to form a gas boundary layer along the extent of said burner hole.

7. An improved method for cooling the refractory material about a burner hole in a furnace for producing silica glass and for preventing such refractory material from contaminating the silica glass, which comprises:
   flowing particles of silicon containing material and gas through a burner positioned above a burner hole and depositing such particles within the furnace as silica glass,
   positioning a porous insert within said burner hole,
   providing a flow passage having a closed end and an open end within said porous insert,
   connecting said open end to a supply of gas under pressure,
   flowing the gas into said flow passage,
   diffusing the gas within said flow passage through an inner wall portion of said porous insert and into and along the extent of said burner hole, and
   forming a boundary layer of gas within said burner hole along the inner wall of said insert to cool both the insert and surrounding burner hole refractory.

8. An improved method of cooling refractory material as defined in claim 7, including the step of flowing a gas through the porous insert selected from the group consisting of oxygen, argon, nitrogen and ambient air.

9. An improved method of cooling refractory material as defined in claim 7, including the step of controlling glass stoichiometry by flowing a gas selected from the group consisting of hydrogen and nitrogen through said porous insert.

10. A liner for protecting a burner hole comprising:
    said liner having an outer housing portion positionable in contact along an inner surface of the burner hole,
    said liner having flow passage means therewithin which is closed at one end and open at an inlet end,
    said inlet end being in communication with a gas under pressure, and
    said liner having porous inner wall means along its extent for diffusing such gas under pressure from said flow passage through such porous inner portions of said liner into said burner hole to form a gas boundary along the burner hole.

* * * * *